United States Patent
Breitling et al.

[11] Patent Number: 6,150,782
[45] Date of Patent: Nov. 21, 2000

[54] PROCESS FOR DETECTING ABUTMENT AND BLOCKING IN AN ELECTRIC MOTOR

[75] Inventors: Wolfram Breitling, Sachsenheim; Juergen Munz, Leinfelden; Harald Eisenhardt, Rutesheim, all of Germany

[73] Assignee: Robert Bosch GmbH, Stuttgart, Germany

[21] Appl. No.: 09/155,486
[22] PCT Filed: Jan. 29, 1997
[86] PCT No.: PCT/DE97/00155
§ 371 Date: Aug. 23, 1999
§ 102(e) Date: Aug. 23, 1999
[87] PCT Pub. No.: WO97/37416
PCT Pub. Date: Oct. 9, 1997

[30] Foreign Application Priority Data

Mar. 29, 1996 [DE] Germany .............. 196 12 596

[51] Int. Cl.[7] .............. H02H 5/04; H02H 7/085
[52] U.S. Cl. .............. 318/434; 318/696; 388/903; 361/23
[58] Field of Search .............. 318/434, 459, 318/471, 472, 473, 474, 696, 685; 388/903, 909, 930, 934; 361/23, 24, 25, 27

[56] References Cited

U.S. PATENT DOCUMENTS

| | | | |
|---|---|---|---|
| 4,888,996 | 12/1989 | Rak et al. ............ | 73/862.19 |
| 4,977,507 | 12/1990 | Matsuoka et al. ............ | 364/424.05 |
| 4,999,552 | 3/1991 | Seipelt ............ | 318/434 |
| 5,510,687 | 4/1996 | Ursworth et al. ............ | 318/727 |

FOREIGN PATENT DOCUMENTS

| | | |
|---|---|---|
| 0 479 045 | 4/1992 | European Pat. Off. . |
| 43 33 675 | 4/1995 | Germany . |
| 195 14 954 | 12/1995 | Germany . |
| 44 19 813 | 12/1995 | Germany . |
| 44 32 059 | 3/1996 | Germany . |
| 2 290 178 | 12/1995 | United Kingdom . |

*Primary Examiner*—Bentsu Ro
*Attorney, Agent, or Firm*—Kenyon & Kenyon

[57] ABSTRACT

In a stop and jamming detection system in an electric motor, in particular a stepping or commutator motor, a parameter is determined by current measurement, from the profile of the instantaneous current by comparison with a reference value, as a signal for the stop and jamming detection system. In addition to sensing the current flowing through a winding of the motor, the instantaneous operating voltage and the resistance of the motor winding are sensed. All three parameters are conveyed to an analysis circuit. By comparison with reference values, a determination is made by the analysis circuit as to whether the motor is jammed or movable. Reliable and economical stop and jamming detection system for an electric motor, which is used in particular in a wide variety of operating conditions in motor vehicles.

4 Claims, 1 Drawing Sheet

PROCESS FOR DETECTING ABUTMENT AND BLOCKING IN AN ELECTRIC MOTOR

FIELD OF THE INVENTION

The present invention relates to a stop and jamming detection system in an electric motor, in particular a stepping or commutator motor, of claim 1.

BACKGROUND INFORMATION

German Patent No. 44 19 813 A1 describes an apparatus for operating an electric motor, stepping motor, or commutator motor, which analyzes an overload or jamming of the drive system for which the electric motor is the power source based on a parameter of a current flowing through the electric motor. The parameter can be determined either within a time interval which still lies within the activation operation after a starting time of the electric motor, or at a predefined sampling time which lags the starting point by a certain delay time. The parameter used for the current being analyzed can be the current amplitude, the change in current, or a current difference, which is evaluated as the signal for the stop and jamming detection system. It is essential in this conventional apparatus that the electric motor be at least approximately current-free at the beginning of the aforesaid starting point, and that the time interval or sampling time occur before steady-state motor current is reached.

SUMMARY OF THE INVENTION

A stop and jamming detection system in an electric motor in accordance with the present invention is more cost-effective than the conventional stop and jamming detection system. Advantageously, this is possible without an additional position check-back (e.g. via potentiometers) or motion check-back (e.g. via Hall sensors).

According to the present invention, in addition to the sensing of the current flowing through a winding of the motor, the instantaneous operating voltage and the resistance of the motor winding are sensed. All three parameters are conveyed to an analysis circuit and a determination is made, by comparison with reference values, as to whether the motor is jammed or movable.

A first advantageous embodiment provides for sensing of the resistance of the motor winding to be accomplished by way of a local measurement of the winding temperature.

A second advantageous embodiment provides for sensing of the resistance of the motor winding to be accomplished, with the motor at a standstill, via resistance determination by measuring the voltage drop at a known measurement resistor which can be connected in series with the winding.

A stop detection system according to the present invention, (referring here to jamming as a result of the mechanical stop), increases the convenience of the system in which it is applied, since the noise generated by the motor running against a stop is reduced. The stop detection system can evaluate the number of steps from stop to stop in stepping motors automatically and without additional outlay.

A jamming detection system according to the present invention makes it possible to use fault handling concepts in the event of faults. The overall convenience and flexibility of the system are thereby substantially improved.

DETAILED DESCRIPTION

Figure 1:
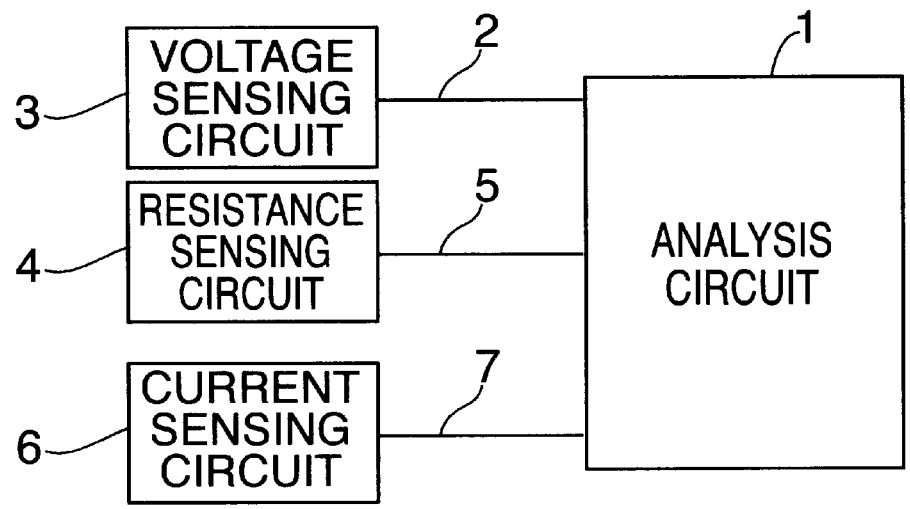
FIG. 1 schematically shows a block diagram of the stop and jamming detection system configured in accordance with the present invention.

FIG. 1 schematically depicts a block diagram of the stop and jamming detection system configured in accordance with the present invention. The value of the instantaneous operating voltage, which is ascertained via a sensing circuit 3, is conveyed to an analysis circuit 1 via an input line 2. In a further sensing circuit 4, the resistance of the motor winding is sensed and conveyed via a line 5 to analysis circuit 1. A third sensing circuit 6 determines the instantaneous current which is flowing through the motor winding. The corresponding value is conveyed via a line 7 to analysis circuit 1. The current flowing through the winding of a jammed motor is greater than when the motor is not jammed.

According to the present invention, analysis circuit 1 takes into account as the signal for the stop and jamming detection system, when analyzing the current to determine whether the motor is movable or jammed, not only the current flowing through the motor winding and determined by sensing circuit 6 but also the values for instantaneous operating voltage and winding resistance determined by sensing circuits 3 and 4, respectively. Based on the values determined, the reference values of the threshold for the current are modified. Analysis circuit 1 emits its determined stop signal or jamming signal via output lines (not depicted in further detail) to the circuits connected to it, for further evaluation.

The present invention makes use of the fact that the current through the winding of an electric motor, for example that of a stepping motor, depends on three parameters: first the operating voltage being applied, second the resistance of the motor winding, and third the movability of the electric motor.

Proceeding, for example, from an application of the present invention in a motor vehicle, it is clear that the operating voltage in the motor vehicle can vary by a factor of approximately 2. In the application under discussion, the operating temperature range of a motor of this kind can vary, for example, between approximately −40° C. and approximately 85° C., so that the resistance of the copper winding of the electric motor also varies by a factor of approximately 2. If these interference effects, namely operating voltage and motor winding resistance, are sensed, the current through a motor winding can be utilized as an indicator of the movability of the motor armature. The current flowing through the winding of a jammed electric motor is greater than the current flowing when the armature can move.

Sensing circuit 4 for determining the resistance of the winding can contain the local measurement of the temperature of the motor winding, calculate the resistance therefrom, and emit a corresponding signal via line 5 to analysis circuit 1.

Figure 2:
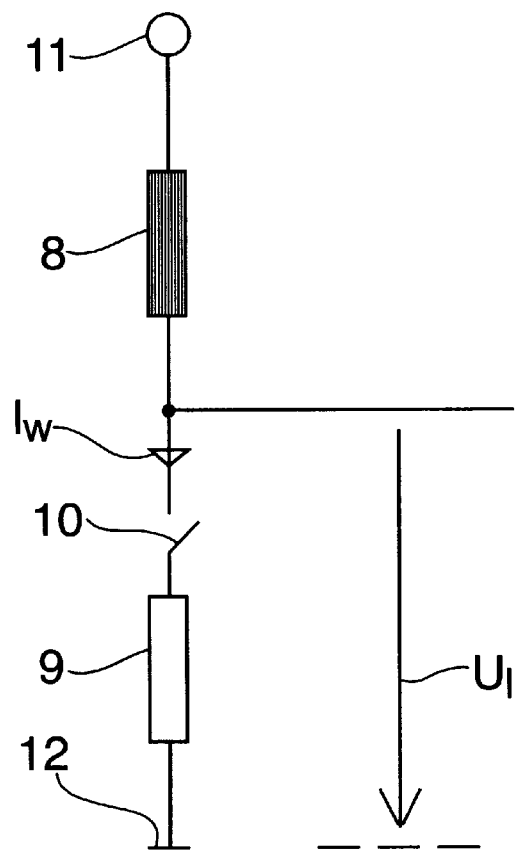
FIG. 2 schematically shows an example of a circuit for determining the winding resistance.

Alternatively, as depicted schematically in FIG. 2, the winding resistance can be determined in sensing circuit 4, with the motor at a standstill, by sensing the resistance of a motor winding 8 via resistance determination by measuring the voltage drop $U_I$ at a known measurement resistor 9, e.g. a measurement shunt, which can be connected in series with winding 8 through a switch 10 between a battery terminal 11 and ground potential 12.

Advantageously, the present invention makes possible highly economical and reliable sensing of the stopped and jammed states of an electric motor under a very wide variety of operating conditions. This is of particular value especially when such electric motors are used for drive purposes in motor vehicles.

What is claimed is:

1. A stop and jamming detection system in an electric motor, comprising:
   a first arrangement for sensing a current flowing through a winding of the motor;
   a second arrangement for sensing an operating voltage of the winding;
   a third arrangement for sensing a resistance of the winding;
   an analysis circuit for receiving the sensed current, the sensed operating voltage, and the sensed resistance, the analysis circuit comparing each of the sensed current, the sensed operating voltage, and the sensed resistance to respective reference values and determining in accordance with the comparison that the motor is in one of a jammed state and a movable state.

2. The stop and jamming detection system according to claim 1, wherein the electric motor is one of a stepping motor and a commutator motor.

3. The stop and jamming detection system according to claim 1, wherein the third arrangement senses the resistance of the winding via a local measurement of a temperature of the winding.

4. The stop and jamming detection system according to claim 1, wherein the third arrangement senses the resistance of the winding when the electric motor is at a standstill, the third arrangement sensing the resistance by measuring a voltage drop at a predetermined measurement resistor, the predetermined measurement resistor being connected in series to the winding.

* * * * *